US011768546B1

(12) United States Patent
Poulos et al.

(10) Patent No.: US 11,768,546 B1
(45) Date of Patent: Sep. 26, 2023

(54) METHOD AND DEVICE FOR POSITIONAL/ROTATIONAL INFORMATION OF A FINGER-WEARABLE DEVICE

(71) Applicant: Apple Inc., Cupertino, CA (US)

(72) Inventors: Adam Gabriel Poulos, Sunnyvale, CA (US); Benjamin Rolf Blachnitzky, San Francisco, CA (US); Nicolai Philip Georg, San Francisco, CA (US); Arun Rakesh Yoganandan, San Francisco, CA (US); Aaron Mackay Burns, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/408,466

(22) Filed: Aug. 22, 2021

Related U.S. Application Data

(60) Provisional application No. 63/082,663, filed on Sep. 24, 2020.

(51) Int. Cl.
*G06F 3/0346* (2013.01)
*G06F 3/01* (2006.01)

(52) U.S. Cl.
CPC ............ *G06F 3/0346* (2013.01); *G06F 3/011* (2013.01); *G06F 3/017* (2013.01); *G06F 2203/0331* (2013.01)

(58) Field of Classification Search
None
See application file for complete search history.

(56) References Cited

U.S. PATENT DOCUMENTS

| 10,593,101 | B1 | 3/2020 | Han et al. |
| 10,852,827 | B1 * | 12/2020 | Bochereau .............. G06F 3/014 |
| 2017/0083115 | A1 | 3/2017 | Speck |
| 2017/0212589 | A1 * | 7/2017 | Domenikos ............. G06F 3/016 |
| 2019/0033988 | A1 | 1/2019 | Hesch et al. |
| 2020/0034978 | A1 | 1/2020 | Giurgica-Tiron et al. |

* cited by examiner

*Primary Examiner* — Aneeta Yodichkas
(74) *Attorney, Agent, or Firm* — Fernando & Partners LLP

(57) ABSTRACT

In one implementation, a method for visually indicating positional/rotational information of a finger-wearable device. The method includes: determining a set of translational values and a set of rotational values for the finger-wearable device, wherein the finger-wearable device is worn on a finger of a user; displaying, via a display, a visual representation of a location of the finger-wearable device based on the set of translational values; generating a visual representation of a grasp region of the user based on the set of translational values and the set of rotational values; and concurrently displaying, via the display, the visual representation of the grasp region with the visual representation of the location of the finger-wearable device.

21 Claims, 9 Drawing Sheets

US 11,768,546 B1

METHOD AND DEVICE FOR POSITIONAL/ROTATIONAL INFORMATION OF A FINGER-WEARABLE DEVICE

CROSS-REFERENCE TO RELATED APPLICATIONS

This application claims the benefit of U.S. Provisional Patent App. No. 63/082,663, filed on Sep. 24, 2020, which is incorporated by reference in its entirety.

TECHNICAL FIELD

The present disclosure generally relates to visualizing input devices and, in particular, to systems, methods, and methods for visually indicating positional/rotational information of a finger-wearable device.

BACKGROUND

In some instances, extremity tracking may introduce inaccuracies when used as the sole input to a virtual environment. For example, there are myriad scenarios in which a user's fingers and/or hands may be occluded by physical objects and/or the user's other hand. As such, a finger-wearable device may be worn by the user in order to track the user's finger more accurately with six degrees of freedom (6DOF). However, a finger indicator, such as a sphere or dot for the user's finger on which the finger-wearable device is being worn, may provide an insufficient indication of the user's ability to grasp objects in the virtual environment. As one example, the user may be unable to determine the directionality of their hand based on a non-directional sphere indicator.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
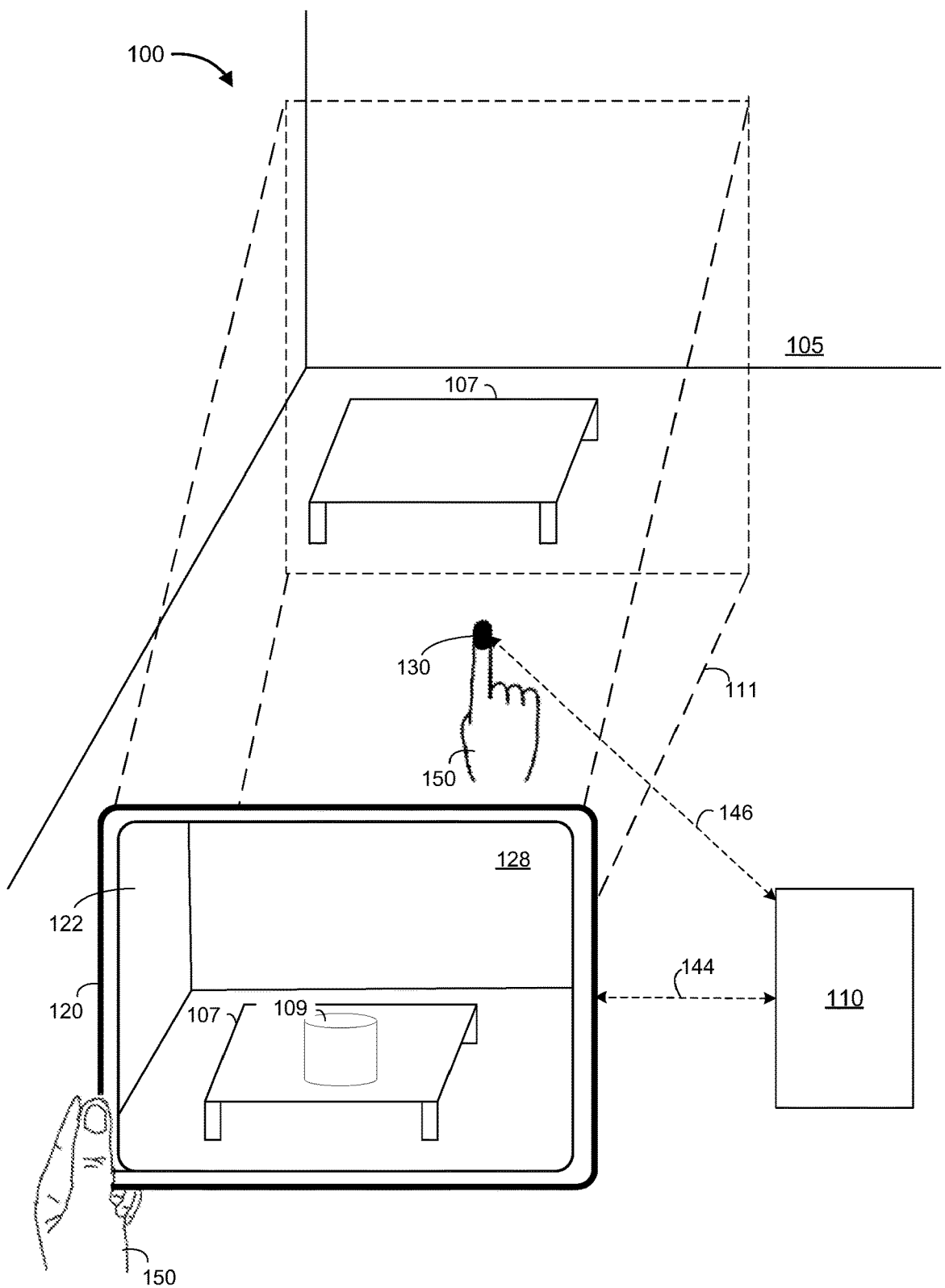
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for visually indicating positional/rotational information of a finger-wearable device. According to some implementations, the method is performed at a computing system including non-transitory memory and one or more processors, wherein the computing system is communicatively coupled to a display device, one or more input devices, and a finger-wearable device. The method includes: determining a set of translational values and a set of rotational values for the finger-wearable device, wherein the finger-wearable device is worn on a finger of a user; displaying, via a display, a visual representation of a location of the finger-wearable device based on the set of translational values; generating a visual representation of a grasp region of the user based on the set of translational values and the set of rotational values; and concurrently displaying, via the display, the visual representation of the grasp region with the visual representation of the location of the finger-wearable device.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110, an electronic device 120 (e.g., a tablet, mobile phone, laptop, near-eye system, wearable computing device, or the like), and a finger-wearable device 130.

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2.

In some implementations, the controller 110 is a computing device that is local or remote relative to a physical environment 105. For example, the controller 110 is a local server located within the physical environment 105. In another example, the controller 110 is a remote server located outside of the physical environment 105 (e.g., a cloud server, central server, etc.).

In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the controller 110 is also communicatively coupled with the finger-wearable device 130 via one or more wired or wireless communication channels 146 (e.g., BLUETOOTH, IEEE 802.11x, IEEE 802.16x, IEEE 802.3x, etc.). In some implementations, the electronic device 120 is (optionally) communicatively coupled with the finger-wearable device 130 via one or more wired or wireless communication channels (e.g., BLUETOOTH, IEEE 802.11x, IEEE 802.16x, IEEE 802.3x, etc.).

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. In some implementations, the functions of the controller 110 are provided by the electronic device 120. As such, in some implementations, the components of the controller 110 are integrated into the electronic device 120.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, gaze/eye tracking data, hand/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand/extremity tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

In some implementations, the finger-wearable device 130 is configured to detect user inputs from the user 150. As one example, the finger-wearable device 130 detects a user input that corresponds to a gesture that manipulates an XR object (e.g., a pinch gesture that shrinks or scales-down an XR object, or a tap gesture manipulating the XR object) and/or the XR environment 128 itself. As another example, the finger-wearable device 130 detects a user input that corresponds to selecting various controls, user interface (UI) menu items, and/or the like (e.g., a tap gesture relative to a menu item). In some implementations, the finger-wearable device 130 is also configured to obtain (e.g., detect, generate, determine, etc.) positional information that relates to the position of the user 150's finger when worn thereby. In some implementations, the finger-wearable device 130 includes a suitable combination of software, firmware, and/or hardware. The finger-wearable device 130 is described in greater detail below with respect to FIG. 4.

Figure 2:
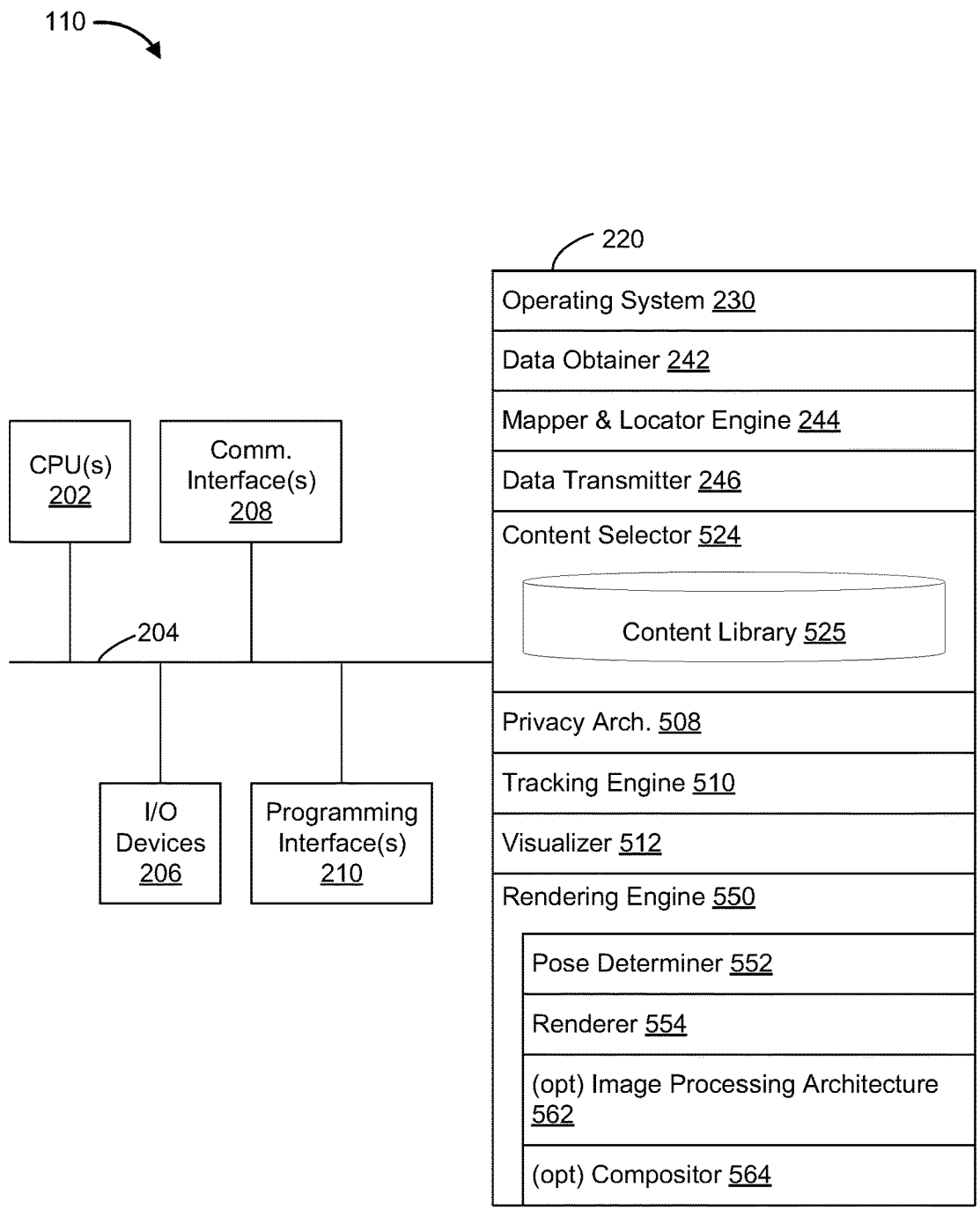
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O)

devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

Figure 4:
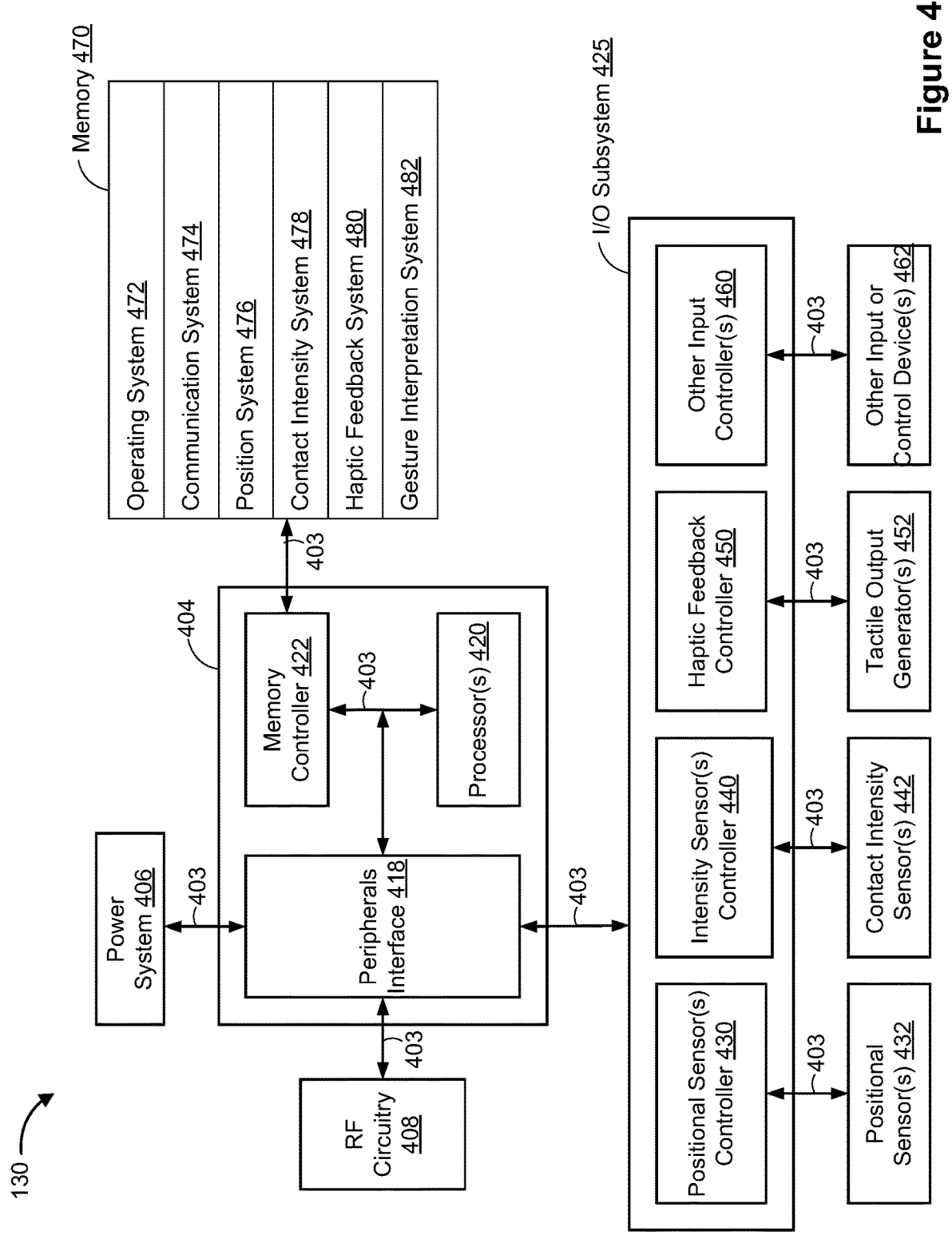
FIG. 4 is a block diagram of an example finger-wearable device in accordance with some implementations.

In some implementations, a data obtainer 242 is configured to obtain data (e.g., captured image frames of the physical environment 105, presentation data, input data, user interaction data, camera pose tracking information, gaze/eye tracking information, head/body pose tracking information, hand/extremity tracking information, positional information associated with the finger-wearable device, sensor data, location data, etc.) from at least one of the I/O devices 206 of the controller 110, the I/O devices and sensors 306 of the electronic device 120, the I/O devices and sensors of the finger-wearable device 130 (e.g., positional sensor(s) 432, contact intensity sensor(s) 442, and other input or control devices(s) 462 shown in FIG. 4), and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120, the finger-wearable device 130, or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120. To that end, in various implementations, the data transmitter 246 includes instructions and/or logic therefor, and heuristics and metadata therefor.

In some implementations, a content selector 524 is configured to select XR content (sometimes also referred to herein as "graphical content" or "virtual content") from a content library 525 based on one or more user requests and/or inputs (e.g., a voice command, a selection from a user interface (UI) menu of XR content items, and/or the like). The content selector 524 is described in more detail below with reference to FIG. 5. To that end, in various implementations, the content selector 524 includes instructions and/or logic therefor, and heuristics and metadata therefor.

In some implementations, the content library 525 includes a plurality of content items such as audio/visual (A/V) content and/or XR content, objects, items, scenery, etc. As one example, the XR content includes 3D reconstructions of user captured videos, movies, TV episodes, and/or other XR content. In some implementations, the content library 525 is pre-populated or manually authored by the user 150. In some implementations, the content library 525 is located local relative to the controller 110. In some implementations, the content library 525 is located remote from the controller 110 (e.g., at a remote server, a cloud server, or the like).

In some implementations, a privacy architecture 508 is configured to filter, obscure, scramble, encrypt, anonymize, etc. user information and/or identifying information. The privacy architecture 508 is described in more detail below with reference to FIG. 5. To that end, in various implementations, the privacy architecture 508 includes instructions and/or logic therefor, and heuristics and metadata therefor.

In some implementations, a tracking engine 510 is configured to obtain (e.g., detect, receive, retrieve, generate, determine, etc.) a set of translational values (e.g., X, Y, and Z values relative to an absolute coordinate system or a coordinate system associated with the physical environment 105) and a set of rotational values (e.g., roll, pitch, and yaw values) for the finger-wearable device 130 based on input data, user interaction data, camera pose tracking information, gaze/eye tracking information, head/body pose tracking information, hand/extremity tracking information, positional information associated with the finger-wearable device 130, sensor data, location data, and/or the like. The tracking engine 510 is described in more detail below with reference to FIG. 5. To that end, in various implementations, the tracking engine 510 includes instructions and/or logic therefor, and heuristics and metadata therefor.

In some implementations, a visualizer 512 is configured to generate a visual representation of a location of the finger-wearable device 130 based on the set of translational values determined by the tracking engine 510. In some implementations, the visualizer 512 is also configured to generate a visual representation of a grasp region of the user 150 based on the set of translational values and the set of rotational values determined by the tracking engine 510. The visualizer 512 is described in more detail below with reference to FIG. 5. To that end, in various implementations, the visualizer 512 includes instructions and/or logic therefor, and heuristics and metadata therefor.

In some implementations, a rendering engine 550 is configured to render an XR environment (or image frame associated therewith) including the visual representations of the finger-wearable device 130 and the grasp region. To that end, in various implementations, the rendering engine 550 includes instructions and/or logic therefor, and heuristics and metadata therefor. In some implementations, the rendering engine 550 includes a pose determiner 552, a renderer 554, an optional image processing architecture 562, and an optional compositor 564. One of ordinary skill in the art will appreciate that the optional image processing architecture 562 and the optional compositor 564 may not be applicable for fully virtual environments.

In some implementations, the pose determiner 552 is configured to determine a current camera pose of the electronic device 120 and/or the user 150 relative to the A/V content and/or XR content. The pose determiner 552 is described in more detail below with reference to FIG. 5. To that end, in various implementations, the pose determiner 552 includes instructions and/or logic therefor, and heuristics and metadata therefor.

In some implementations, the renderer 554 is configured to render the A/V content and/or the XR content, including the visual representations of the finger-wearable device 130 and the grasp region, according to the current camera pose relative thereto. The renderer 554 is described in more detail below with reference to FIG. 5. To that end, in various implementations, the renderer 554 includes instructions and/or logic therefor, and heuristics and metadata therefor.

In some implementations, the optional image processing architecture 562 is configured to obtain (e.g., receive, retrieve, or capture) an image stream including one or more images of the physical environment 105 from the current camera pose of the electronic device 120 and/or the user 150. In some implementations, the image processing architecture 562 is also configured to perform one or more image processing operations on the image stream such as warping, color correction, gamma correction, sharpening, noise reduction, white balance, and/or the like. The image processing architecture 562 is described in more detail below with reference to FIG. 5. To that end, in various implementations, the image processing architecture 562 includes instructions and/or logic therefor, and heuristics and metadata therefor.

In some implementations, the optional compositor 564 is configured to composite the rendered A/V content and/or XR content with the processed image stream of the physical environment 105 from the image processing architecture 562 to produce rendered image frames of the XR environment (sometimes also referred to herein as a "graphical environment" or "virtual environment") for display. The compositor 564 is described in more detail below with reference to FIG. 5. To that end, in various implementations, the compositor 564 includes instructions and/or logic therefor, and heuristics and metadata therefor.

Although the data obtainer 242, the mapper and locator engine 244, the data transmitter 246, the content selector 524, the privacy architecture 508, the tracking engine 510, the visualizer 512, and the rendering engine 550 are shown as residing on a single device (e.g., the controller 110), it should be understood that in other implementations, any combination of the data obtainer 242, the mapper and locator engine 244, the data transmitter 246, the content selector 524, the privacy architecture 508, the tracking engine 510, the visualizer 512, and the rendering engine 550 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
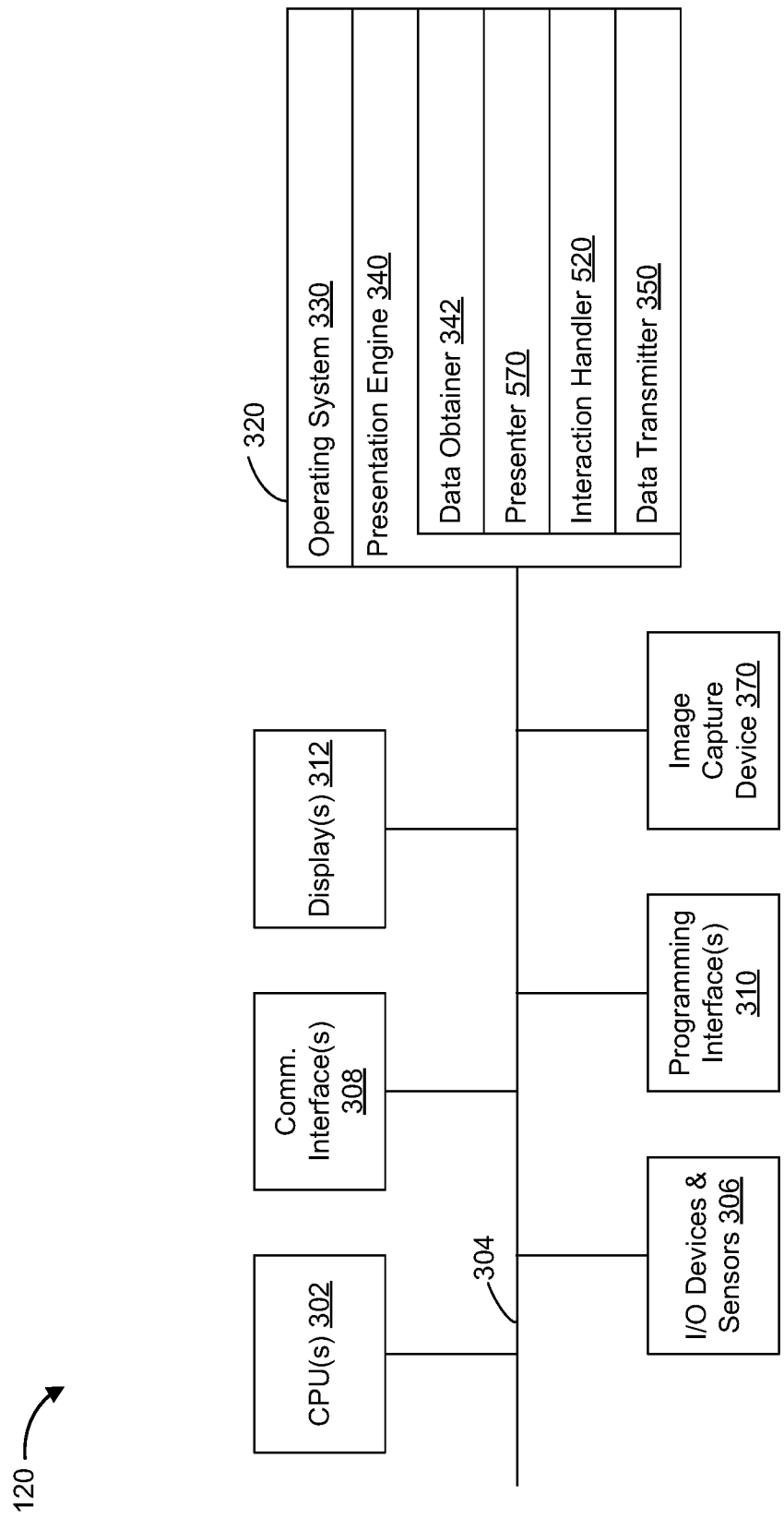
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an gaze/eye tracking engine, a body/head pose tracking engine, a hand/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 corresponds to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 570, an interaction handler 520, and a data transmitter 350.

In some implementations, the data obtainer 342 is configured to obtain data (e.g., presentation data such as rendered image frames associated with the user interface/XR environment, input data, user interaction data, head tracking information, camera pose tracking information, gaze/eye tracking information, hand/extremity tracking information, sensor data, location data, etc.) from at least one of the I/O devices 206 of the controller 110, the I/O devices and sensors 306 of the electronic device 120, the I/O devices and sensors of the finger-wearable device 130, and the remote input devices. To that end, in various implementations, the data obtainer 342 includes instructions and/or logic therefor, and heuristics and metadata therefor.

In some implementations, the presenter 570 is configured to present and update A/V content and/or XR content (e.g., the rendered image frames associated with the user interface or the XR environment), including the visual representations of the finger-wearable device 130 and the grasp region, via the one or more displays 312. To that end, in various implementations, the presenter 570 includes instructions and/or logic therefor, and heuristics and metadata therefor.

In some implementations, the interaction handler 520 is configured to detect user interactions with the presented A/V content and/or XR content (e.g., gestural inputs detected via hand/extremity tracking, eye gaze inputs detected via gaze/eye tracking, voice commands, etc.). To that end, in various implementations, the interaction handler 520 includes instructions and/or logic therefor, and heuristics and metadata therefor.

In some implementations, the data transmitter 350 is configured to transmit data (e.g., presentation data, location data, user interaction data, head tracking information, hand/extremity tracking information, camera pose tracking information, gaze/eye tracking information, etc.) to at least the controller 110. To that end, in various implementations, the data transmitter 350 includes instructions and/or logic therefor, and heuristics and metadata therefor.

Although the data obtainer 342, the presenter 570, the interaction handler 520, and the data transmitter 350 are shown as residing on a single device (e.g., the electronic device 120), it should be understood that in other implementations, any combination of the data obtainer 342, the presenter 570, the interaction handler 520, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 is a block diagram of an example of a finger-wearable device 130. The finger-wearable device 130 includes a memory 470 (which optionally includes one or more computer readable storage mediums), a memory controller 422, one or more processing units (CPUs) 420, a peripherals interface 418, an RF circuitry 408, and an input/output (I/O) subsystem 425. These components optionally communicate over one or more communication buses or signal lines 403. One of ordinary skill in the art will appreciate that the finger-wearable device 130 illustrated in FIG. 4 is one example of a finger-wearable device, and that the finger-wearable device 130 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

The finger-wearable device 130 includes a power system 406 for powering the various components. The power system 406 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 470 optionally includes high-speed random-access memory and optionally also includes non-volatile memory, such as one or more flash memory devices, or other non-volatile solid-state memory devices. Access to memory 470 by other components of the finger-wearable device 130, such as processor(s) 420 and the peripherals interface 418, is, optionally, controlled by memory controller 422.

The peripherals interface 418 can be used to couple input and output peripherals of the finger-wearable device 130 to the processor(s) 420 and the memory 470. The one or more processors 420 run or execute various software programs and/or sets of instructions stored in memory 470 to perform various functions for the finger-wearable device 130 and to process data.

In some implementations, the peripherals interface 418, the processor(s) 420, and the memory controller 422 are, optionally, implemented on a single chip, such as a chip 404. In some implementations, they are implemented on separate chips.

The RF (radio frequency) circuitry 408 receives and sends RF signals, also called electromagnetic signals. The RF circuitry 408 converts electrical signals to/from electromagnetic signals and communicates with the controller 110 and/or the electronic device 120, communications networks, and/or other communications devices via the electromagnetic signals. The RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 425 couples input/output peripherals on the finger-wearable device 130, such as other input or control devices 462, with the peripherals interface 418. The I/O subsystem 425 optionally includes one or more positional sensor controllers 430, one or more intensity sensor controllers 440, a haptic feedback controller 450, and one or more other input controllers 460 for other input or control devices. The one or more other input controllers 460 receive/send electrical signals from/to other input or control devices 462. The other input or control devices 462 optionally include physical buttons (e.g., push buttons, rocker buttons, etc.), dials, slider switches, click wheels, and so forth. In some implementations, the other input controller(s) 462 are, optionally, coupled with any (or none) of the following: an infrared port and/or a USB port.

In some implementations, the finger-wearable device 130 includes one or more positional sensors 432 that output positional data associated with the finger-wearable device 130. The positional data is indicative of a position, orientation, or movement of the finger-wearable device 130, such as a rotational movement or translational movement of the finger-wearable device 130. For example, the positional sensor(s) 432 include an inertial measurement unit (IMU) that provides 3D rotational data, such as roll, pitch, and yaw information. To that end, the IMU may include a combination of an accelerometer, gyroscopes, magnetometers, and/or the like. As another example, the positional sensor(s) 432 include a magnetic sensor that provides 3D positional data, such as the position of the finger-wearable device 130. For example, the magnetic sensor measures weak magnetic fields in order to determine a position of the finger-wearable device 130.

In some implementations, the finger-wearable device 130 includes one or more contact intensity sensors 442 for detecting intensity (e.g., pressure) of a contact of a finger of a user wearing the finger-wearable device 130. The one or more contact intensity sensors 442 output contact intensity data associated with the finger-wearable device 130. As one example, the contact intensity data is indicative of the pressure associated with the finger-wearable device 130 while a finger of a user wearing the finger-wearable device 130 is tapping on (e.g., making contact with) a surface of a physical table. The one or more contact intensity sensors 442 may include an interferometer. The one or more contact intensity sensors 442 may include one or more piezoresistive strain gauges, capacitive force sensors, electric force sensors, piezoelectric force sensors, optical force sensors, capacitive touch-sensitive surfaces, or other intensity sensors.

The finger-wearable device 130 optionally includes one or more tactile output generators 452 for generating tactile outputs on the finger-wearable device 130. In some implementations, the term "tactile output" refers to physical displacement of an accessory (e.g., the finger-wearable device 130) of an electronic device (e.g., the electronic device 120) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 130 is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 4 shows the tactile output generator(s) 452 coupled with a haptic feedback controller 450. The tactile output generator(s) 452 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 452 receive tactile feedback generation instructions from a haptic feedback system 450 and generates tactile outputs on the finger-wearable device 130 that are capable of being sensed by a user of the finger-wearable device 130.

In some implementations, the software components stored in the memory 470 include an operating system 472, a communication system (or set of instructions) 474, a position system (or set of instructions) 476, a contact intensity system (or set of instructions) 478, a haptic feedback system (or set of instructions) 480, and a gesture interpretation system (or set of instructions) 482. Furthermore, in some implementations, the memory 470 stores a device/global internal state associated with the finger-wearable device 130. The device/global internal state includes one or more of: sensor state, including information obtained from the finger-wearable device 130's various sensors and other input or control devices 460; positional state, including information regarding the finger-wearable device 130's position (e.g., position, orientation, tilt, roll and/or distance) relative to an electronic device (e.g., the electronic device 120); and location information concerning the finger-wearable device 130's absolute position.

The operating system 472 includes various software components and/or drivers for controlling and managing general system tasks (e.g., memory management, power management, etc.) and facilitates communication between various hardware and software components.

In some implementations, the communication system 474 facilitates communication between the finger-wearable device 130 and other devices (e.g., the controller 110 and/or the electronic device 120), and also includes various software components (e.g., for handling data received by the RF circuitry 408) that are adapted for coupling directly to other devices or indirectly over a network (e.g., the Internet, wireless LAN, BLUETOOTH, etc.).

In some implementations, the position system 476, in conjunction with positional data from the one or more positional sensor(s) 432, optionally obtains (e.g., detects, generates, determines, etc.) positional information concerning the finger-wearable device 130 (e.g., translational values and/or rotational values). The position system 476 optionally includes software components for performing various operations related to detecting the position of the finger-wearable device 130 and detecting changes to the position of the finger-wearable device 130 in a particular frame of reference. In some implementations, the position system 476 detects the positional state of the finger-wearable device 130 relative to the electronic device and detects changes to the positional state of the finger-wearable device 130 relative to the electronic device. As noted above, in some implementations, the controller 110 and/or the electronic device 120 determines the positional state of the finger-wearable device 130 relative to the electronic device 120 and changes the positional state of the finger-wearable device 130 using information from the position system 476.

In some implementations, the contact intensity system 478, in conjunction with contact intensity data from the one or more contact intensity sensor(s) 442, optionally obtains (e.g., detects, generates, determines, etc.) contact intensity information associated with the finger-wearable device 130. The contact intensity system 478 includes software components for performing various operations related to detection of contact, such as detecting the intensity and/or duration of a contact between the finger-wearable device 130 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

In some implementations, the haptic feedback system 480 includes various software components for generating instructions used by the tactile output generator(s) 452 to produce tactile outputs at one or more locations on the finger-wearable device 130 in response to user interactions with the finger-wearable device 130.

In some implementations, the gesture interpretation system 482 coordinates with the position system 476, the contact intensity system 478, and/or the like to determine a gesture performed by the finger-wearable device 130. For example, the gesture includes one or more of: a pinch gesture, a pull gesture, a pinch and pull gesture, a rotational gesture, a tap gesture, and/or the like. In some implementations, the finger-wearable device 130 does not include a gesture interpretation system, and an electronic device determines a gesture performed by the finger-wearable device 130 based on finger manipulation data from the finger-wearable device 130. In some implementations, a portion of the gesture determination is performed at the finger-wearable device 130, and a portion of the gesture determination is performed at an electronic device. In some implementations, the gesture interpretation system 482 determines a time duration associated with a gesture. In some implementations, the gesture interpretation system 482 determines a contact intensity associated with a gesture, such as an amount of pressure associated with a user's finger tapping on a physical surface while the finger of the user is wearing the finger-wearable device 130.

Moreover, FIG. 4 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
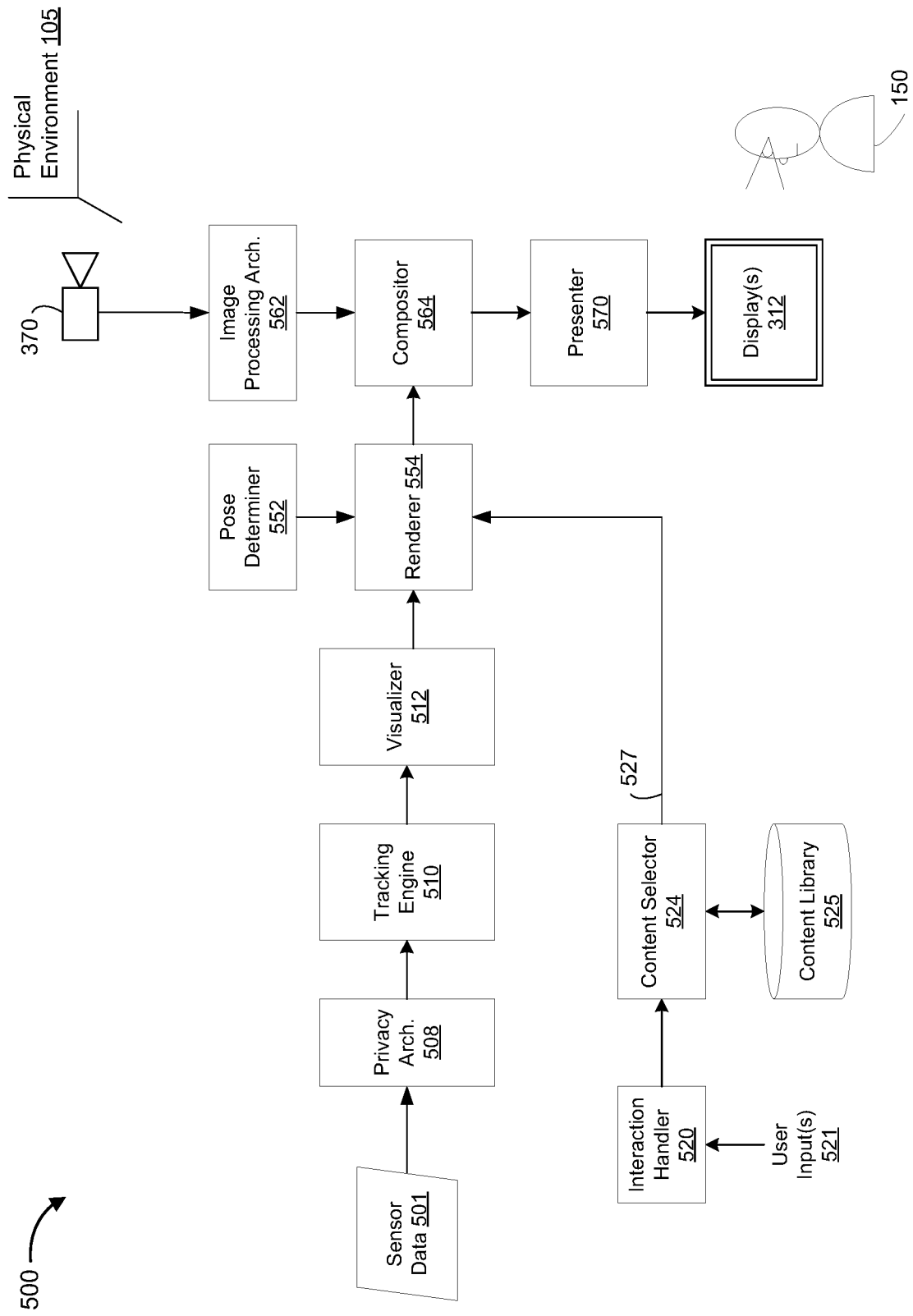
FIG. 5 is a block diagram of an example content delivery architecture in accordance with some implementations.

FIG. 5 is a block diagram of an example content delivery architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 500 is included in a computing system such as the controller 110 shown in FIGS. 1 and 2; the electronic device 120 shown in FIGS. 1 and 3; the finger-wearable device 130 shown in FIGS. 1 and 4; and/or a suitable combination thereof As shown in FIG. 5, the privacy architecture 508 ingests sensor data 501. In some implementations, the sensor data 501 corresponds to unprocessed and/or processed data/information from I/O devices and/or sensors of the controller 110, the electronic device 120, the finger-wearable device 130, and/or the optional remote input devices. In some implementations, the sensor data 501 includes positional information associated with the finger-wearable device 130 (e.g., translational values and/or rotational values), location data, user interaction data, head tracking information, hand/extremity tracking information, camera pose tracking information, gaze/eye tracking information, and/or the like.

In some implementations, the privacy architecture 508 includes one or more privacy filters associated with user information and/or identifying information. In some implementations, the privacy architecture 508 includes an opt-in feature where the electronic device 120 informs the user 150 as to what user information and/or identifying information is being monitored and how the user information and/or the identifying information will be used. In some implementations, the privacy architecture 508 selectively prevents and/or limits the content delivery architecture 500 or portions thereof from obtaining and/or transmitting the user information. To this end, the privacy architecture 508 receives user preferences and/or selections from the user 150 in response to prompting the user 150 for their informed consent and/or opt-in confirmation. In some implementations, the privacy architecture 508 prevents the content delivery architecture 500 from obtaining and/or transmitting the user information unless and until the privacy architecture 508 obtains informed consent from the user 150. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes. As another example, the privacy architecture 508 anonymizes certain types of user information likely to include sensitive and/or identifying information, independent of user designation (e.g., automatically).

According to some implementations, the tracking engine 510 ingests the sensor data 501 after it has been subjected to the privacy architecture 508. In some implementations, the tracking engine 510 obtains (e.g., detects, receives, retrieves, generates, determines, etc.) a set of translational values and a set of rotational values for the finger-wearable device 130 based on the sensor data 501.

In some implementations, the visualizer 512 generates a visual representation of a location of the finger-wearable device 130 based on the set of translational values determined by the tracking engine 510. In some implementations, the visualizer 512 also generates a visual representation of a grasp region of the user 150 based on the set of translational values and the set of rotational values determined by the tracking engine 510. According to some implementations, the grasp region corresponds to a region/portion of the physical environment 105 that is graspable/reachable by the hand of the user 150 on which the finger-wearable device 130 is being worn.

According to some implementations, the interaction handler 520 obtains (e.g., receives, retrieves, or detects) one or more user inputs 521 provided by the user 150 that are associated with selecting A/V content and/or XR content for presentation or otherwise manipulating the A/V content and/or XR content. For example, the one or more user inputs 521 correspond to a contact or gestural input selecting XR content from a UI menu detected by the finger-wearable device 130, a gestural input selecting XR content from a UI menu detected via hand/extremity tracking, an eye gaze input selecting XR content from the UI menu detected via eye tracking, a voice command selecting XR content from the UI menu detected via a microphone, and/or the like.

In some implementations, the content selector 524 selects XR content 527 from the content library 525 based on one or more user inputs 521 (e.g., a voice command, a selection from a menu of XR content items, and/or the like).

According to some implementations, the pose determiner 552 determines a current camera pose of the electronic device 120 and/or the user 150 relative to the XR content 527 and/or the physical environment 105. In some implementations, the renderer 554 renders the XR content 527, including the visual representation of the location of the finger-wearable device 130 and the grasp region, according to the current camera pose relative thereto.

According to some implementations, the optional image processing architecture 562 obtains an image stream from an image capture device 370 including one or more images of the physical environment 105 from the current camera pose of the electronic device 120 and/or the user 150. In some implementations, the image processing architecture 562 also performs one or more image processing operations on the image stream such as warping, color correction, gamma correction, sharpening, noise reduction, white balance, and/or the like. In some implementations, the optional compositor 564 composites the rendered XR content with the processed image stream of the physical environment 105 from the image processing architecture 562 to produce rendered image frames of the XR environment. As such, in some implementations, the FOV of the image capture device 370, including the arm and/or hand of the user 150, may be composited with the rendered XR content (e.g., for video pass-through or MR applications). In various implementations, the presenter 570 presents the rendered image frames of the XR environment to the user 150 via the one or more displays 312 of the electronic device 120. One of ordinary skill in the art will appreciate that the optional image processing architecture 562 and the optional compositor 564 may not be applicable for fully virtual environments. As such, in some implementations, the arm and/or hand of the user 150 may not be composited with the rendered XR content (e.g., for fully VR applications).

Figure 6A:
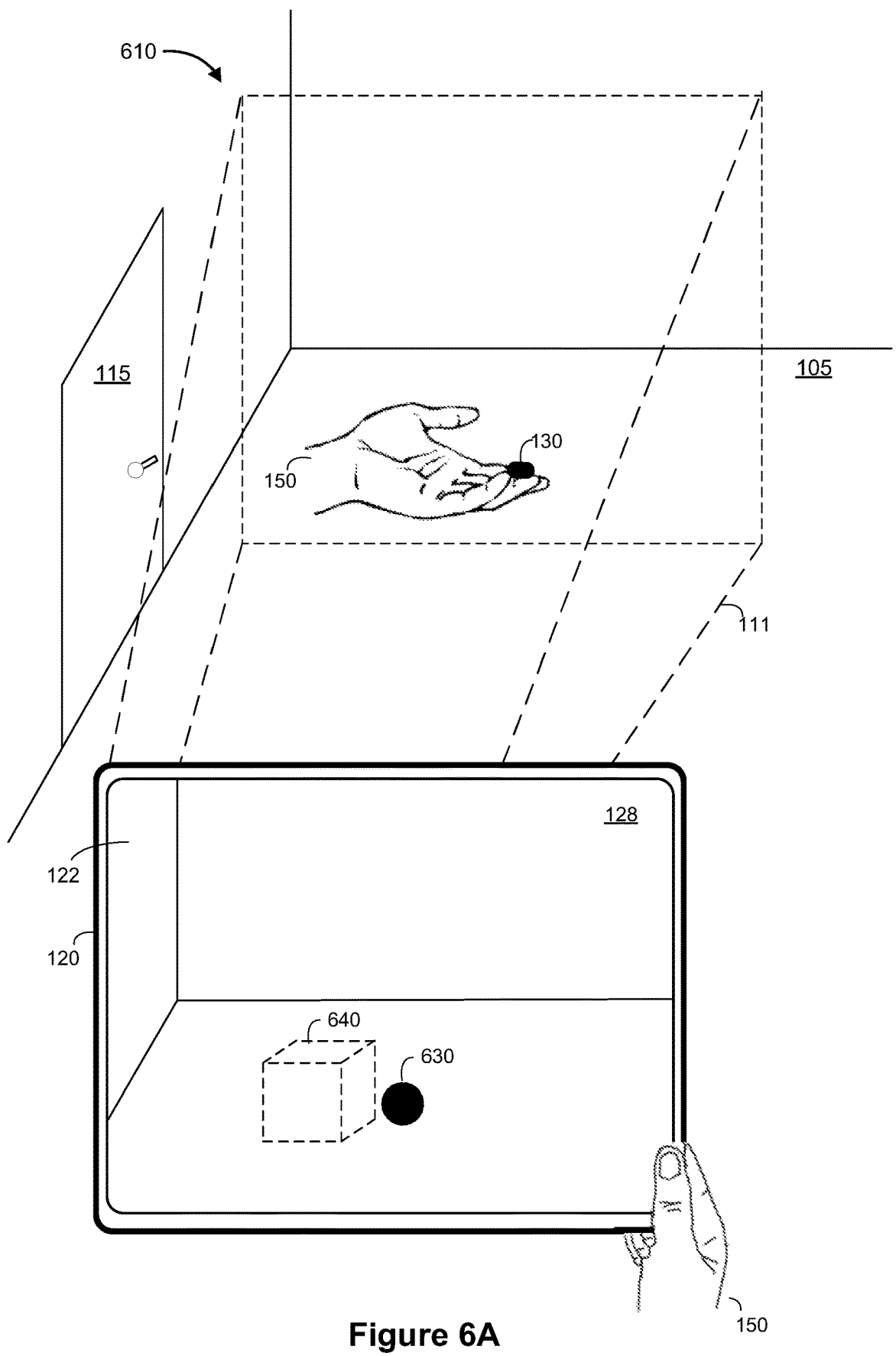
FIGS. 6A-6C illustrate example content delivery scenarios in accordance with some implementations.
Figure 6B:
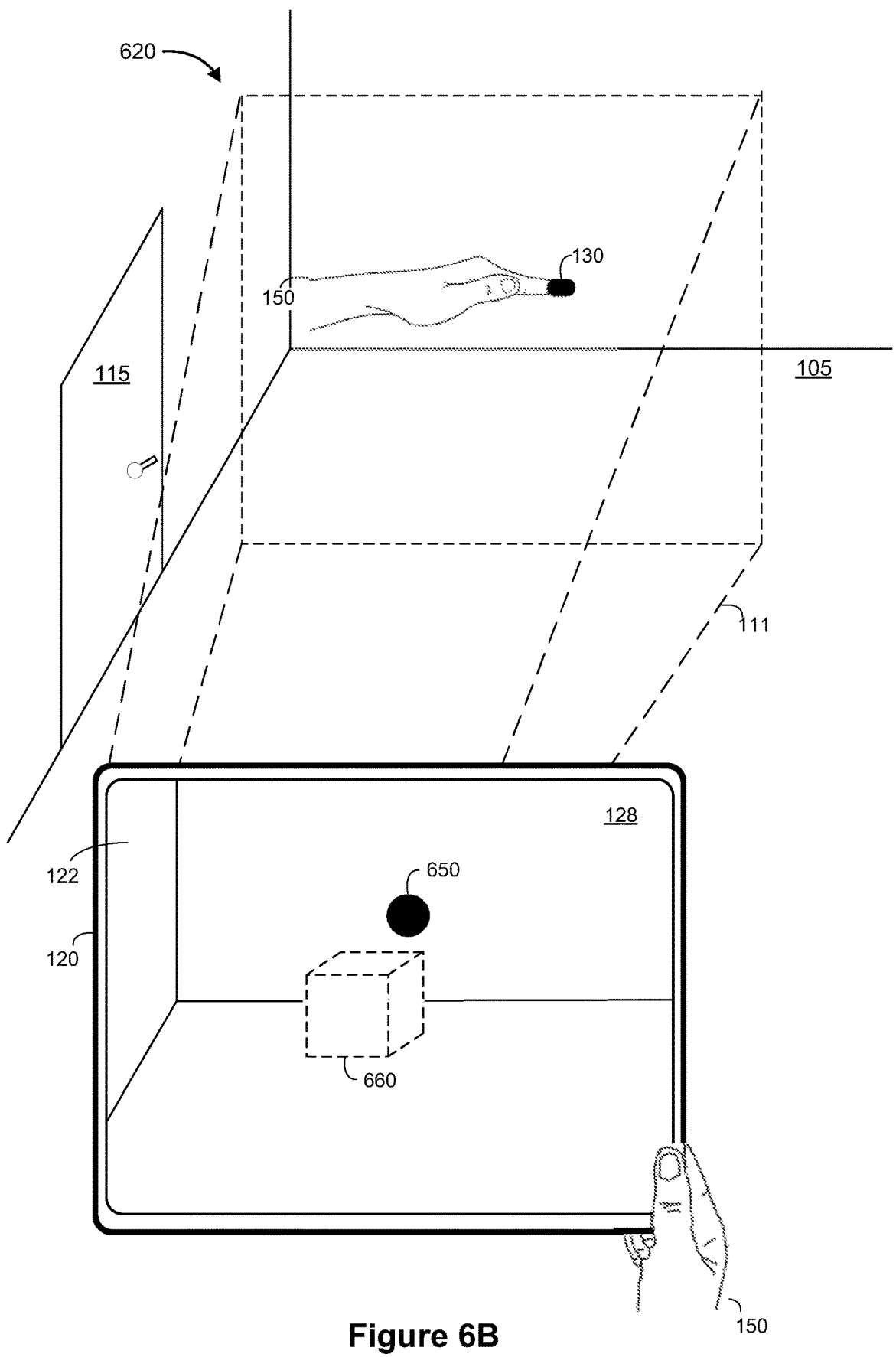
Figure 6C:
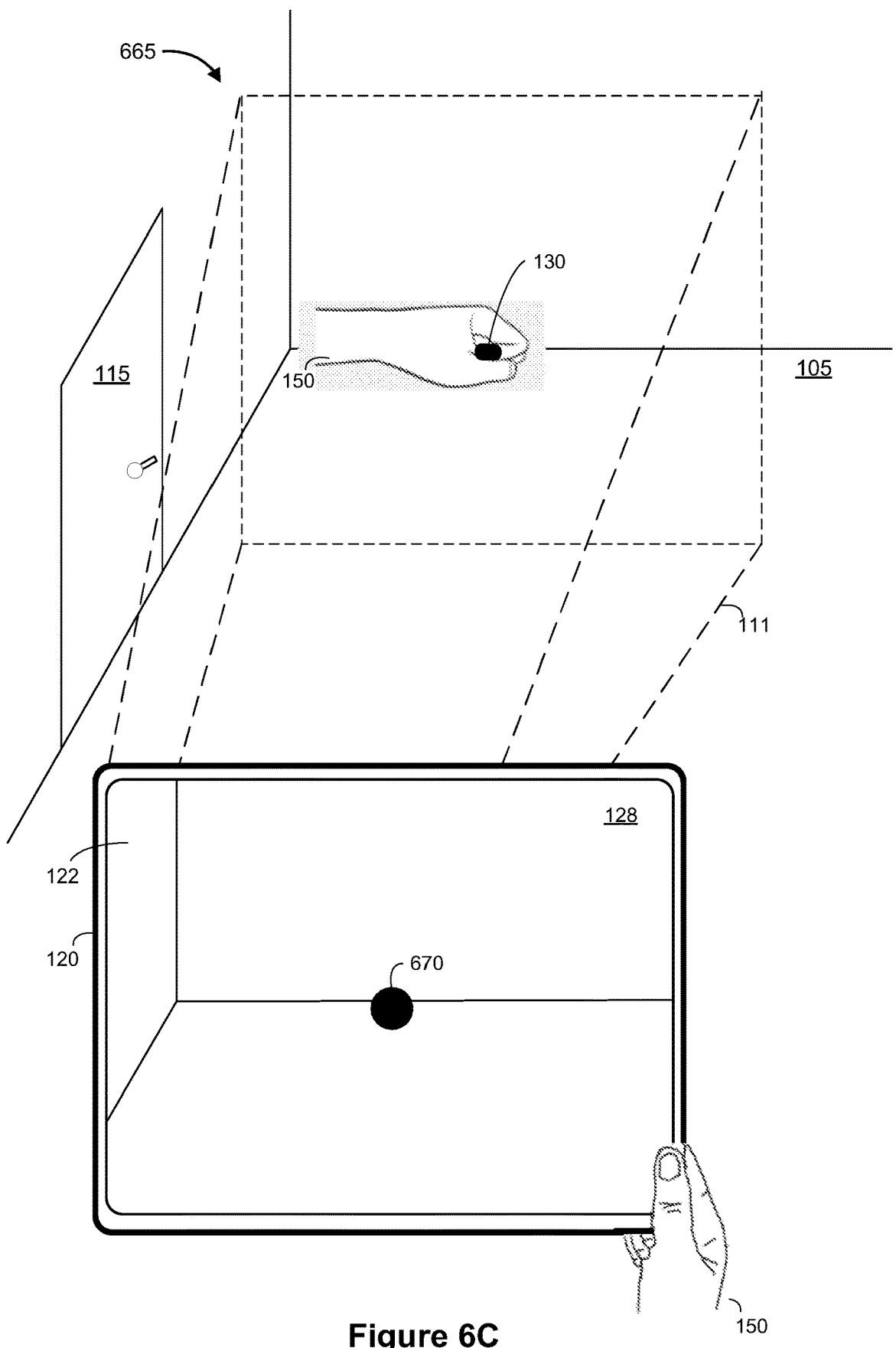

FIGS. 6A-6C illustrate content delivery scenarios 610, 620, and 665 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the content delivery scenarios 610, 620, and 665 are rendered and presented by a computing system such as the controller 110 shown in FIGS. 1 and 2; the electronic device 120 shown in FIGS. 1 and 3; the finger-wearable device 130 shown in FIGS. 1 and 4; and/or a suitable combination thereof As shown in FIGS. 6A-6C, the content delivery scenarios 610, 620, and 665 include a physical environment 105 and an XR environment 128 displayed on the display 122 of the electronic device 120. The electronic device 120 presents the XR environment 128 to the user 150 while the user 150 is physically present within the physical environment 105 that includes a door 115, which is not currently within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122. As such, in some implementations, images associated with the FOV 111 of the image capture device 370 of the electronic device 120, including the arm and/or hand of the user 150, may be composited with the rendered XR content and the below-mentioned visual representations (e.g., for video pass-through or MR applications). In some implementations, the arm and/or hand of the user 150 may not be composited with the rendered XR content and the below-mentioned visual representations (e.g., for fully VR applications). For example, the electronic device 120 corresponds to a mobile phone, tablet, laptop, near-eye system, wearable computing device, or the like.

As shown in FIG. 6A, during the content delivery scenario 610 (e.g., associated with time $T_1$), the electronic device 120 presents an XR environment 128 (e.g., without video pass-through of the physical environment 105) including a visual representation 630 of the finger-wearable device 130 and a visual representation 640 of a grasp region. In this example, the visual representation 640 of the grasp region is located adjacent to the left side of the visual representation 630 of the finger-wearable device 130 due to the orientation of the left hand of the user 150 on which the finger-wearable device 130 is being worn (e.g., palm up). For example, the visual representation 630 corresponds to a location of the finger-wearable device 130 represented by a sphere indicating a tip of the left index finger of the user 150. For example, the visual representation 640 corresponds to a cube-shaped volumetric region generated based on a length of the left index finger of the user 150 and/or one of more dimensions of the left hand of the user 150 associated with the left index finger.

As shown in FIG. 6B, during the content delivery scenario 620 (e.g., associated with time $T_2$), the electronic device 120 presents an XR environment 128 (e.g., without video pass-through of the physical environment 105) including a visual representation 650 of the finger-wearable device 130 and a visual representation 660 of a grasp region. In this example, the visual representation 660 of the grasp region is located adjacent to and below the visual representation 650 of the finger-wearable device 130 due to the orientation of the left hand of the user 150 on which the finger-wearable device 130 is being worn (e.g., palm down).

As shown in FIG. 6C, during the content delivery scenario 665 (e.g., associated with time $T_3$), the electronic device 120 presents an XR environment 128 (e.g., without video pass-through of the physical environment 105) including a visual representation 670 of the finger-wearable device 130. This example does not include a visual representation of the grasp region due to the orientation of the left hand of the user 150 on which the finger-wearable device 130 is being worn (e.g., clenched fist).

One of ordinary skill in the art will appreciate that the size, shape, pattern, fill, coloration, texture, etc. the visual representations 630, 650, and 670 of the finger-wearable device 130 in FIGS. 6A- 6C (e.g., a sphere) are merely examples that may be differently sized, shaped, colored, textured, etc. in various other implementations. One of ordinary skill in the art will appreciate that the size, shape, pattern, fill, coloration, texture, etc. of the visual representations 640 and 660 of the grasp region in FIGS. 6A and 6B (e.g., a dotted cube) are merely examples that may be differently sized, shaped, colored, textured, etc. in various other implementations.

Figure 7:
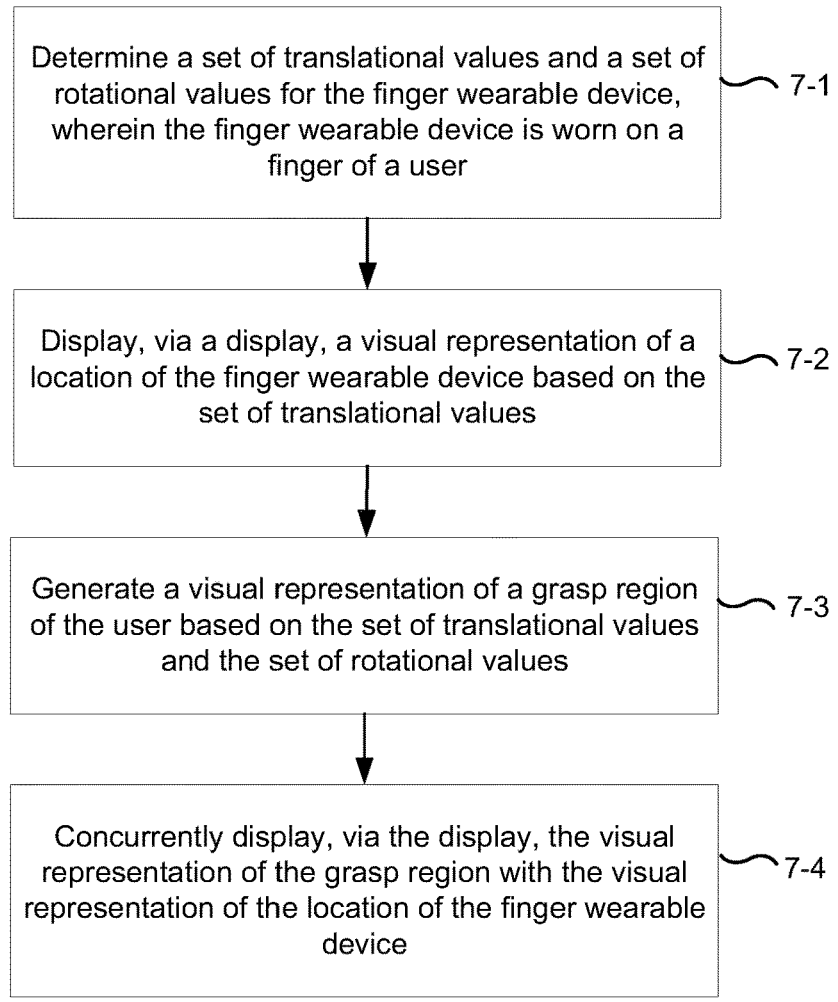
FIG. 7 is a flowchart representation of a method of visually indicating positional/rotational information of a finger-wearable device in accordance with some implementations.

FIG. 7 is a flowchart representation of a method 700 of visually indicating positional/rotational information of a finger-wearable device in accordance with some implementations. In various implementations, the method 700 is performed at a computing system including non-transitory memory and one or more processors, wherein the computing system is communicatively coupled to a display device, one or more input devices, and a finger-wearable device (e.g., the electronic device 120 shown in FIGS. 1 and 3; the controller 110 in FIGS. 1 and 2; the finger-wearable device 130 in FIGS. 1 and 4; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, in some instances, extremity tracking may introduce inaccuracies when used as the sole input to a virtual environment. For example, there are myriad scenarios in which a user's fingers and/or hands may be occluded by physical objects and/or the user's other hand. As such, a finger-wearable device may be worn by the user in order to track the user's finger more accurately with six degrees of freedom (6DOF). However, a finger indicator, such as a sphere or dot for the user's finger on which the finger-wearable device is being worn, may provide an insufficient indication of the user's ability to grasp objects in the virtual environment. As one example, the user may be unable to determine the directionality of their hand based on a non-directional sphere indicator. As such, while a user is using a finger-wearable device in communication with an XR-capable computing system, the computing system concurrently displays a visual representation of a grasp region along with a visual representation of the finger-wearable device in order to convey contextual information to the user corresponding to available manipulations of XR content. Furthermore, the visual representation of the grasp region unambiguously show which virtual object(s) may be affected by a user interaction and allow the device to detect/track user interactions with reduced precision, which, as a result, reduces resource/battery consumption (e.g., all virtual object(s) within the grasp region are selected/grabbed).

As represented by block 7-1, the method 700 includes determining a set of translational values and a set of rotational values for the finger-wearable device, wherein the finger-wearable device is worn on a finger of a user. In some implementations, with reference to FIGS. 1-5, the computing system or a component thereof (e.g., the tracking engine 510 in FIGS. 2 and 5) obtains (e.g., detects, receives, retrieves, generates, determines, etc.) a set of translational values and a set of rotational values for the finger-wearable device 130 based on input data, user interaction data, camera pose tracking information, gaze/eye tracking information, head/body pose tracking information, hand/extremity tracking information, positional information associated with the finger-wearable device, sensor data, location data, and/or the like.

In some implementations, the method 700 includes obtaining, via a communication interface, positional information from the finger-wearable device, and wherein the set of translational values and the set of rotational values for the finger-wearable device are determined based at least in part from the positional information. In some implementations, other tracking systems, such as computer vision tracking, may be used to track the finger-wearable device more accurately.

As represented by block 7-2, the method 700 includes displaying, via the display, a visual representation of a location of the finger-wearable device based on the set of translational values. In some implementations, with reference to FIGS. 1-5, the computing system or a component thereof (e.g., the visualizer 512 in FIGS. 2 and 5) generates a visual representation of a location of the finger-wearable device 130 based on the set of translational values determined by the tracking engine 510. For example, FIGS. 6A-6C show various visual representations 630, 650, and 670, respectively, of the finger-wearable device 130 based on the translational values therefor relative to the physical environment 105. One of ordinary skill in the art will appreciate that the size, shape, pattern, fill, coloration, texture, etc. the visual representations 630, 650, and 670 of the finger-wearable device 130 in FIGS. 6A- 6C (e.g., a sphere) are merely examples that may be differently sized, shaped, colored, textured, etc. in various other implementations.

In some implementations, the visual representation of the location of the finger-wearable device corresponds to a sphere indicating a tip of the finger of the user. In some implementations, the visual representation of the location of the finger-wearable device corresponds to an articulatable portion of the finger that bends in order to show at least one of angle or orientation of the finger.

As represented by block 7-3, the method 700 includes generating a visual representation of a grasp region of the user based on the set of translational values and the set of rotational values. In some implementations, with reference to FIGS. 1-5, the computing system or a component thereof (e.g., the visualizer 512 in FIGS. 2 and 5) generates a visual representation of a grasp region of the user 150 based on the set of translational values and the set of rotational values determined by the tracking engine 510. For example, FIGS. 6A and 6B show visual representations 640 and 660, respectively, of the grasp region based on the orientation of the left hand of the user 150 on which the finger-wearable device 130 is being worn. One of ordinary skill in the art will appreciate that the size, shape, pattern, fill, coloration, texture, etc. of the visual representations 640 and 660 of the grasp region in FIGS. 6A and 6B (e.g., a dotted cube) are merely examples that may be differently sized, shaped, colored, textured, etc. in various other implementations.

In some implementations, the visual representation of the grasp region corresponds to a volumetric region generated based on a length of the finger. In some implementations, the visual representation of the grasp region corresponds to a volumetric region generated based on one of more dimensions of a hand of the user associated with the finger. In some implementations, the visual representation of the grasp region is positioned relative to the body of the user 150 such as a location corresponding to a centroid of the palm of the user 150 or the like. In FIG. 6C, for example, the content delivery scenario 665 does not include a visual representation of the grasp region due to the orientation of the left hand of the user 150 on which the finger-wearable device 130 is being worn (e.g., clenched fist).

As represented by block 7-4, the method 700 includes concurrently displaying, via the display, the visual representation of the grasp region with the visual representation of the location of the finger-wearable device. In some implementations, with reference to FIGS. 1-5, the computing system or a component thereof (e.g., the presenter 570 in FIGS. 3 and 5) presents an XR environment including the visual representations of the finger-wearable device 130 and the grasp region via the one or more displays 312 of the electronic device 120. For example, the representation of grasp region is adjacent to the representation of the finger location. FIGS. 6A-6C visual representations 630, 650, and 670, respectively, of the finger-wearable device 130. FIGS. 6A and 6B show visual representations 640 and 660, respectively, of the grasp region based on the orientation of the left hand of the user 150 on which the finger-wearable device 130 is being worn.

In some implementations, the method 700 includes: concurrently displaying, via the display, an extended reality (XR) object (sometimes also referred to as a "graphical object" or a "virtual object"); detecting one or more user interactions with the XR object; and in response to detecting the one or more user interactions, updating the XR object based on a location of the grasp region while detecting the one or more user interactions with the XR object using the grasp region. For example, updating the XR object corresponds to at least one of rotating the XR object, translating the XR object, or performing actions to the XR object thereon such as changing a color, texture, size, and/or the like of the XR object. As one example, the one or more user interactions are based on a double clutch interaction scheme associated with the grasp region: (A) detection of a first user input that grabs/selects the XR object relative to the location of the grasp region; and (B) detection of a second user input that drops/releases the XR object relative to the location of the grasp region. As another example, the one or more user interactions are based on a forward clutch interaction scheme associated with the grasp region: (A) detection of a first user input that grabs/selects the XR object relative to the location of the grasp region; and (B) completion/release of the first user input that drops/releases the XR object. For example, virtual objects within the grasp region are selected/grabbed according to the one or more user interactions.

In some implementations, with reference to FIGS. 1-5, the computing system or a component thereof (e.g., the presenter 570 in FIGS. 3 and 5) presents the XR environment including at least one interactable and/or manipulatable XR object. In some implementations, with reference to FIGS. 1-5, the computing system or a component thereof (e.g., the interaction handler 520 in FIGS. 3 and 5) detects one or more user interactions with the XR object. In some implementations, with reference to FIGS. 1-5, the computing system or a component thereof (e.g., the renderer 554 in FIGS. 3 and 5) updates the XR object within the XR environment (sometimes also referred to as a "graphical environment" or a "virtual environment") based on the one or more user interactions directed thereto.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
  at a computing system including non-transitory memory and one or more processors, wherein the computing system is communicatively coupled to a display device, one or more input devices, and a finger-wearable device:
    determining a set of translational values and a set of rotational values for the finger-wearable device, wherein the finger-wearable device is worn on a finger of a user of the computing system;
    displaying, via the display device, a visual representation of a location of the finger-wearable device based on the set of translational values;
    generating a visual representation of a grasp region of the user of the computing system based on the set of translational values and the set of rotational values for the finger-wearable device and one of more dimensions of a hand associated with the finger of the user of the computing system; and
    concurrently displaying, via the display device, the visual representation of the grasp region with the visual representation of the location of the finger-wearable device.

2. The method of claim 1, wherein the visual representation of the location of the finger-wearable device corresponds to a sphere indicating a tip of the finger of the user of the computing system.

3. The method of claim 1, wherein the visual representation of the location of the finger-wearable device corresponds to an articulatable portion of the finger that bends in order to show at least one of angle or orientation of the finger.

4. The method of claim 1, wherein the visual representation of the grasp region corresponds to a volumetric region generated based on a length of the finger.

5. The method of claim 1, wherein the visual representation of the grasp region corresponds to a volumetric region generated based on one of more dimensions of the hand associated with the finger of the user of the computing system.

6. The method of claim 1, further comprising:
  obtaining, via a communication interface, positional information from the finger-wearable device, and wherein the set of translational values and the set of rotational values for the finger-wearable device are determined based at least in part from the positional information.

7. The method of claim 1, further comprising:
  concurrently displaying, via the display device, an extended reality (XR) object;
  detecting, via the one or more input devices, one or more user interactions with the XR object; and
  in response to detecting the one or more user interactions, updating the XR object based on a location of the grasp region while detecting the one or more user interactions with the XR object using the grasp region.

8. A device comprising:
  one or more processors;
  a non-transitory memory;
  an interface for communicating with a display device, one or more input devices, and a finger-wearable device; and
  one or more programs stored in the non-transitory memory, which, when executed by the one or more processors, cause the device to:
    determine a set of translational values and a set of rotational values for the finger-wearable device, wherein the finger-wearable device is worn on a finger of a user of the computing system;
    display, via the display device, a visual representation of a location of the finger-wearable device based on the set of translational values;
    generate a visual representation of a grasp region of the user of the computing system based on the set of translational values and the set of rotational values for the finger-wearable device and one of more dimensions of a hand associated with the finger of the user of the computing system; and
    concurrently display, via the display device, the visual representation of the grasp region with the visual representation of the location of the finger-wearable device.

9. The device of claim 8, wherein the visual representation of the location of the finger-wearable device corresponds to a sphere indicating a tip of the finger of the user of the computing system.

10. The device of claim 8, wherein the visual representation of the location of the finger-wearable device corresponds to an articulatable portion of the finger that bends in order to show at least one of angle or orientation of the finger.

11. The device of claim 8, wherein the visual representation of the grasp region corresponds to a volumetric region generated based on a length of the finger.

12. The device of claim 8, wherein the visual representation of the grasp region corresponds to a volumetric region generated based on one of more dimensions of the hand associated with the finger of the user of the computing system.

13. The device of claim 8, wherein the one or more programs further cause the device to:
   obtain, via a communication interface, positional information from the finger-wearable device, and wherein the set of translational values and the set of rotational values for the finger-wearable device are determined based at least in part from the positional information.

14. The device of claim 8, wherein the one or more programs further cause the device to:
   concurrently display, via the display device, an extended reality (XR) object;
   detect, via the one or more input devices, one or more user interactions with the XR object; and
   in response to detecting the one or more user interactions, updating the XR object based on a location of the grasp region while detecting the one or more user interactions with the XR object using the grasp region.

15. A non-transitory memory storing one or more programs, which, when executed by one or more processors of a device with an interface for communicating with a display device, one or more input devices, and a finger-wearable device, cause the device to:
   determine a set of translational values and a set of rotational values for the finger-wearable device, wherein the finger-wearable device is worn on a finger of a user of the computing system;
   display, via the display device, a visual representation of a location of the finger-wearable device based on the set of translational values;
   generate a visual representation of a grasp region of the user based on the set of translational values and the set of rotational values for the finger-wearable device and one of more dimensions of a hand associated with the finger of the user of the computing system; and
   concurrently display, via the display device, the visual representation of the grasp region with the visual representation of the location of the finger-wearable device.

16. The non-transitory memory of claim 15, wherein the visual representation of the location of the finger-wearable device corresponds to a sphere indicating a tip of the finger of the user of the computing system.

17. The non-transitory memory of claim 15, wherein the visual representation of the location of the finger-wearable device corresponds to an articulatable portion of the finger that bends in order to show at least one of angle or orientation of the finger.

18. The non-transitory memory of claim 15, wherein the visual representation of the grasp region corresponds to a volumetric region generated based on a length of the finger.

19. The non-transitory memory of claim 15, wherein the visual representation of the grasp region corresponds to a volumetric region generated based on one of more dimensions of the hand associated with the finger of the user of the computing system.

20. The non-transitory memory of claim 15, wherein the one or more programs further cause the device to:
   obtain, via a communication interface, positional information from the finger-wearable device, and wherein the set of translational values and the set of rotational values for the finger-wearable device are determined based at least in part from the positional information.

21. The non-transitory memory of claim 15, wherein the one or more programs further cause the device to:
   concurrently display, via the display device, an extended reality (XR) object;
   detect, via the one or more input devices, one or more user interactions with the XR object; and
   in response to detecting the one or more user interactions, updating the XR object based on a location of the grasp region while detecting the one or more user interactions with the XR object using the grasp region.

* * * * *